(12) United States Patent
Seidl

(10) Patent No.: US 11,690,481 B2
(45) Date of Patent: Jul. 4, 2023

(54) APPARATUS FOR PREPARING A FOAM FROM A FOOD LIQUID, IN PARTICULAR FROM MILK OR A MILK-BASED LIQUID

(71) Applicant: LUIGI LAVAZZA S.p.A., Turin (IT)

(72) Inventor: Florian Seidl, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 954 days.

(21) Appl. No.: 16/349,465

(22) PCT Filed: Nov. 20, 2017

(86) PCT No.: PCT/IB2017/057250
§ 371 (c)(1),
(2) Date: May 13, 2019

(87) PCT Pub. No.: WO2018/092102
PCT Pub. Date: May 24, 2018

(65) Prior Publication Data
US 2020/0187718 A1 Jun. 18, 2020

(30) Foreign Application Priority Data
Nov. 21, 2016 (IT) .......................... 102016000117248

(51) Int. Cl.
*A47J 43/046* (2006.01)
*A47J 43/042* (2006.01)

(52) U.S. Cl.
CPC ......... *A47J 43/0465* (2013.01); *A47J 43/042* (2013.01)

(58) Field of Classification Search
CPC .............................. A47J 43/0465; B01F 33/45
(Continued)

(56) References Cited

U.S. PATENT DOCUMENTS 1,242,493 A 10/1917 Stringham
2,549,121 A 4/1951 Osterheld
(Continued)

FOREIGN PATENT DOCUMENTS

CN 202234930 U 5/2012
CN 103191666 A 7/2013
(Continued)

OTHER PUBLICATIONS

Communication dated Jun. 30, 2021, from the China National Intellectual Property Administration in application No. 2017800717425.
(Continued)

*Primary Examiner* — Marc C Howell
(74) *Attorney, Agent, or Firm* — Sughrue Mion, PLLC

(57) ABSTRACT

An apparatus for preparing foam from a milk-based liquid. The apparatus (1) includes: a support base; a container containing an amount liquid, the container being arrangeable in a working position on the support base; a stirrer adapted to be removably positioned in the container to rotate about an axis of rotation; and a driving device, positioned outside the container (3) and arranged to be magnetically coupled with the stirrer to drive it in rotation about the axis of rotation to stir the liquid contained in the container and form the foam. The driving device includes a stator (12) disposed around a member of the stirrer (8) generating a rotating magnetic field about the axis of rotation for inducing a rotation of the member (9) to drive the stirring device.

2 Claims, 3 Drawing Sheets

(58) Field of Classification Search
USPC .............................................. 99/452; 366/273
See application file for complete search history.

(56) References Cited

U.S. PATENT DOCUMENTS

| | | | | |
|---|---|---|---|---|
| 4,752,138 | A | * | 6/1988 | Rufer .................... B01F 33/452 |
| | | | | 366/601 |
| 8,887,628 | B2 | * | 11/2014 | Cai .................... A47J 27/21066 |
| | | | | 99/452 |
| 2002/0196705 | A1 | * | 12/2002 | Jersey ................. A47J 43/0465 |
| | | | | 366/274 |

FOREIGN PATENT DOCUMENTS

| | | | |
|---|---|---|---|
| CN | 203207850 U | 9/2013 | |
| CN | 103505079 A | 1/2014 | |
| CN | 104640487 A | 5/2015 | |
| DE | 945 183 C | 7/1956 | |
| EP | 1243315 A1 * | 9/2002 | ............. B01F 13/08 |
| EP | 1 972 241 B1 | 10/2010 | |

OTHER PUBLICATIONS

Written Opinion for PCT/IB2017/057250, dated Feb. 9, 2018.
International Search Report for PCT/IB2017/057250, dated Feb. 9, 2018.

* cited by examiner

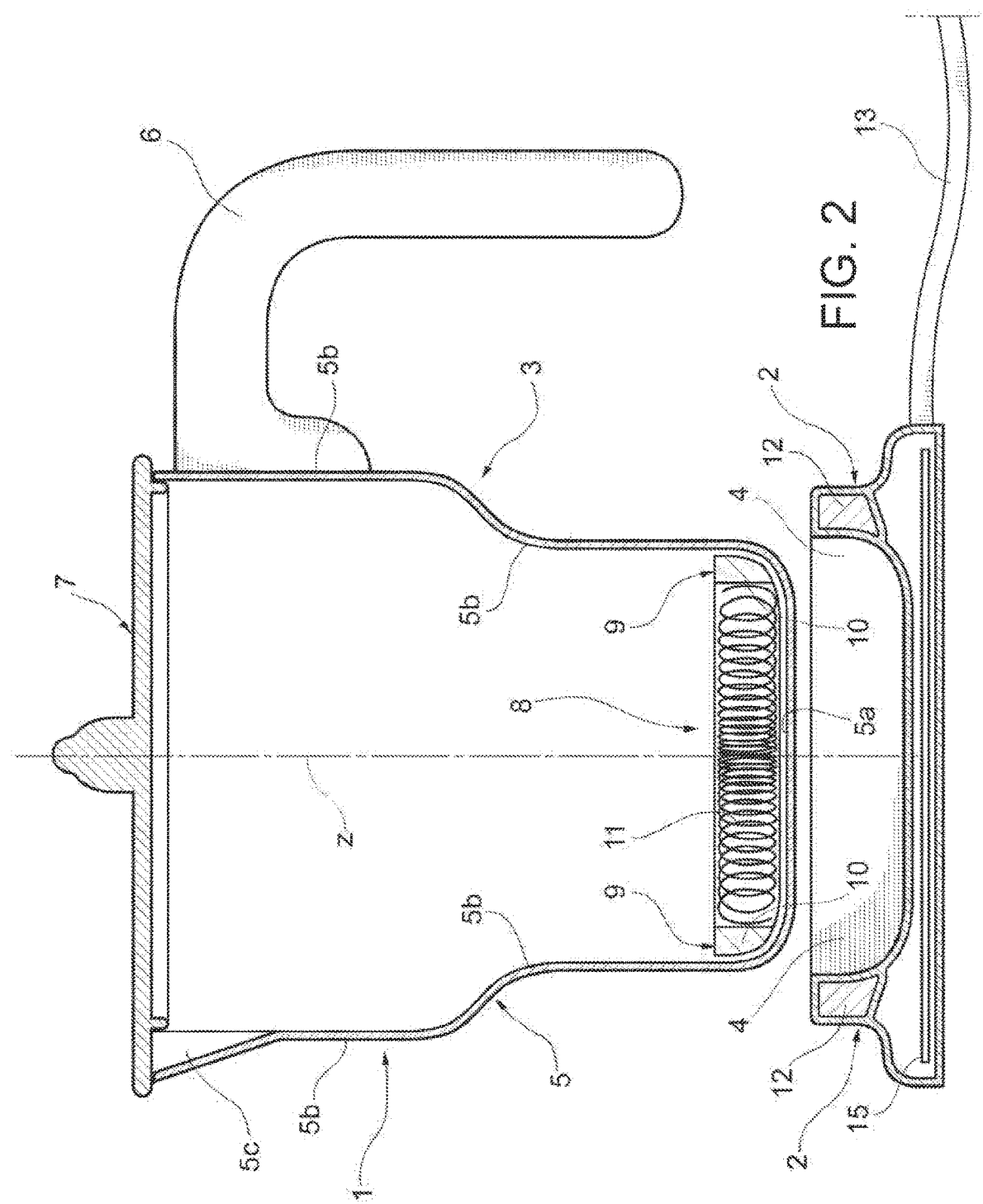

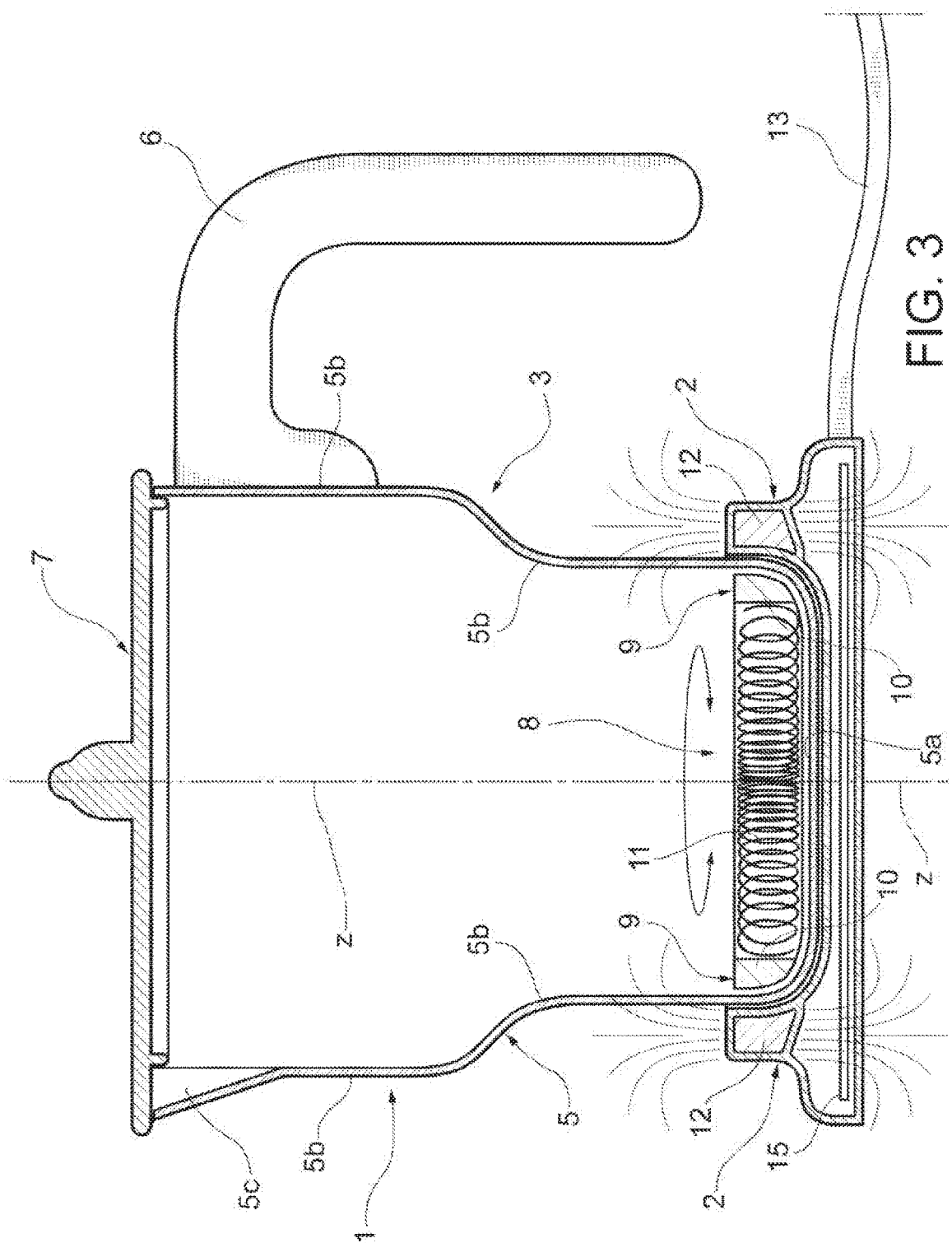

APPARATUS FOR PREPARING A FOAM FROM A FOOD LIQUID, IN PARTICULAR FROM MILK OR A MILK-BASED LIQUID

CROSS REFERENCE TO RELATED APPLICATIONS

This Application is a National Stage of International Application No. PCT/IB2017/057250 filed Nov. 20, 2017, claiming priority based on Italian Patent Application No. 102016000117248 filed Nov. 21, 2016.

BACKGROUND OF THE INVENTION

Field of the Invention

The present invention relates to an apparatus for preparing a foam from a food liquid, like milk or a milk-based liquid.

More specifically, the invention relates to an apparatus comprising:
- a support base,
- a container adapted to contain an amount of said liquid, the container being arrangeable in a working position on the support base,
- a stirrer adapted to be removably positioned in the container to be driven in rotation about an axis of rotation, and
- electrically-operated driving means, positioned outside the container and adapted to be magnetically coupled with the stirrer to drive the latter in rotation about said axis of rotation to stir the liquid contained in the container and form said foam, wherein the stirrer comprises a member provided with permanent magnets and stirring means connected to said member.

Background

An apparatus of the type described above is known, for example, from EP 1 972 241 A1. In the apparatus shown and described in this document, the stirrer is mounted in use rotatably about a hub which is made eccentrically in the bottom wall of the container and the driving means comprise a conventional electric motor, which is mounted under the bottom wall of the container and has a shaft extending vertically in the cavity defined underneath and inside the hub. The shaft of the electric motor carries a magnetic driving portion that is separate from the motor and is magnetically coupled with the permanent magnets of the stirrer.

Such a known apparatus has the drawback of requiring to form said hub, protruding upwards (or, alternatively, downwards) from the bottom wall of the container. Moreover, the hub makes it inconvenient to wash and clean the container in a dishwasher machine, since it creates "grey" areas that cannot be reached by the jets emitted by the spinning spray arms of the machine. Furthermore, such a known apparatus is relatively complicated due to the need to use a driving motor of a conventional type, including a rotor and a stator, as well as a magnetic driving portion that is carried by the rotor shaft inside the hub and is intended to drive the stirrer in rotation.

It is therefore an object of the present invention to provide an apparatus for preparing a foam from a food liquid, like milk or a milk-based liquid, that allows to overcome the drawbacks mentioned above of prior art apparatuses.

SUMMARY OF THE INVENTION

This and other objects are achieved according to the present invention by virtue of an apparatus having the features set forth below.

Advantageous embodiments of an apparatus according to the present invention are described as well.

In short, the invention is based on the fact that the driving means comprise a stator that is disposed around the member of the stirrer provided with the permanent magnets, at least when the container is placed in the working position on the support base, and is adapted—when coupled with an electric power supply—to generate a rotating magnetic field about said axis of rotation in order to cause rotation of the member of the stirrer provided with the permanent magnets, and thus drive in rotation the stirring means connected to that member.

An apparatus according to the present invention may be made with no protrusion or positioning recess in the bottom wall of the container. Moreover, the stirrer is driven in rotation only due to its magnetic coupling with a stator of an electric motor that, in use, generates a rotating magnetic field capable of interacting with the permanent magnets of the stirrer to cause rotation of the latter.

Conveniently, the stirrer is operatively positioned on the bottom wall of the container and has outer transverse sizes that are close to the inner transverse sizes of a portion of the side wall of the container adjacent to the bottom wall. In this case, the right positioning of the stirrer with respect to the stator that generates the rotating magnetic field is guaranteed simply by the bottom wall of the container, on which the stirrer lies, and by said bottom portion of the lateral wall of the container, adjacent to the bottom wall, with no need for further dedicated positioning means.

Preferably, the member of the stirrer that is provided with permanent magnets is made with an annular configuration and the associated stirring means extends at least partially inside said member.

According to a preferred embodiment, the stator intended to generate, in use, the rotating magnetic field is mounted inside the support base, around a seat of the latter in which the container is positioned in use.

In an alternative embodiment, the stator intended to generate, in use, the rotating magnetic field may be integrated or applied in other way around the bottom portion of the lateral wall of the container.

BRIEF DESCRIPTION OF THE DRAWINGS

Further features and advantages of the invention will become apparent from the following detailed description, given purely by way of non-limiting example with reference to the appended drawings, where:

FIG. 2 is an axial section view of the apparatus of FIG. 1, where the container is shown disengaged from the associated support base; and FIG. 3 is an axial section view of the apparatus of FIG. 1, where the container is shown positioned in the working position in a corresponding seat of the support base.

DETAILED DESCRIPTION OF THE INVENTION

Figure 1:
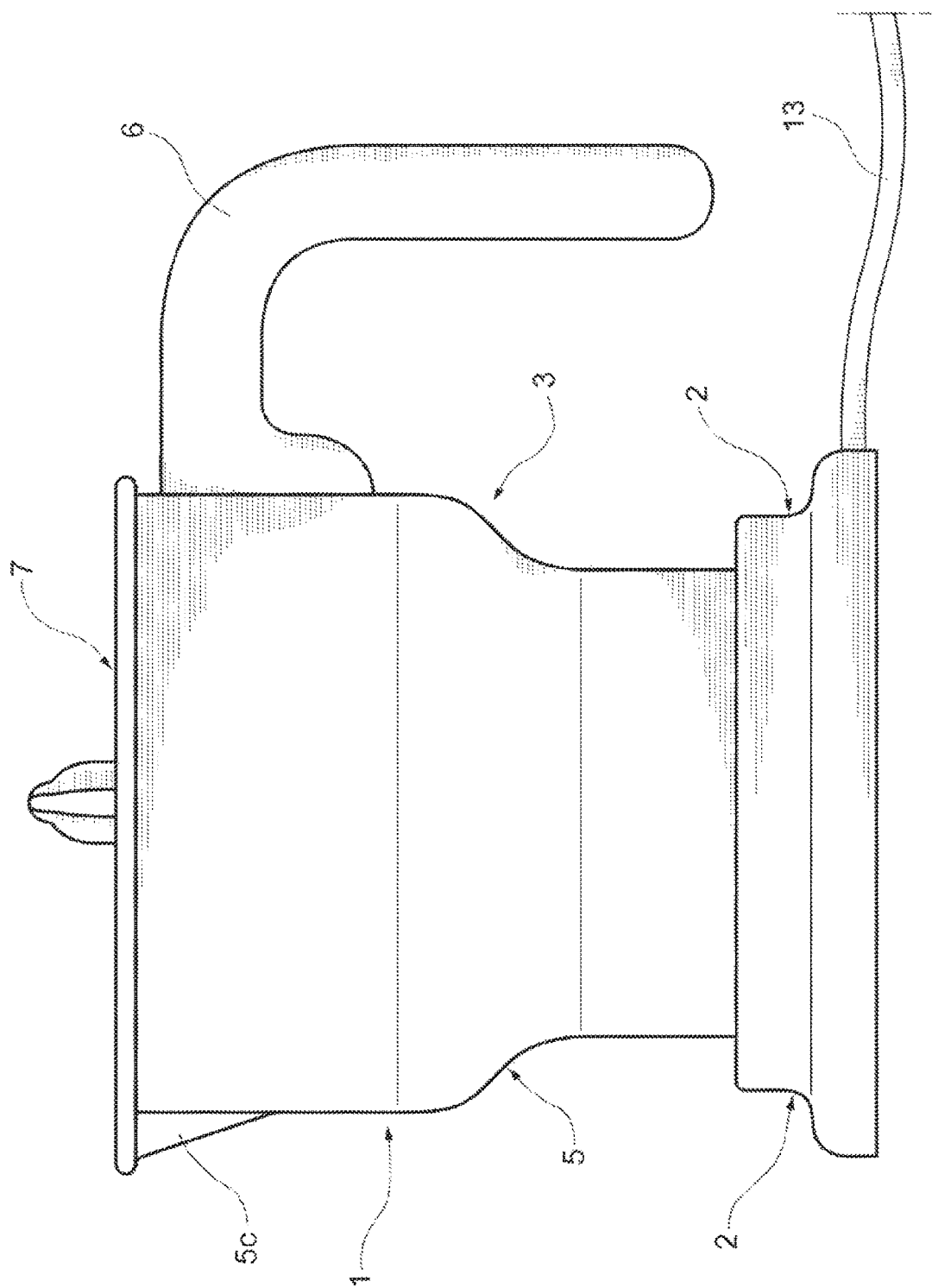
FIG. 1 is a side elevation view of an apparatus for preparing a foam from a food liquid according to the present invention.

In the drawings, reference numeral 1 generally indicates an apparatus according to an embodiment of the present invention, which apparatus can be used to prepare a foam from a food liquid, in particular milk or a milk-based liquid, for the preparation of beverages, like cappuccino, latte, hot chocolate, etc.

The apparatus 1 basically comprises a support base 2 and a container 3 intended to contain an amount of said food liquid. The container 3 is arrangeable in a working position on the support base 2, as shown in FIGS. 1 and 3.

In the embodiment shown by way of example, the support base 2 has, at its top, a seat 4 (FIG. 2) shaped as a cavity or recess, into which a bottom portion of a body 5 of the container 3 is insertable.

The body 5 of the container 3 is made in a material permeable to the magnetic field and has a bottom wall 5a, with which an annular-shaped lateral wall 5b, generally directed upwards, is joined. In the embodiment shown, the body 5, and more in particular the lateral wall 5b, forms a pouring spout 5c, whose presence is nevertheless not mandatory.

The container 3 may be conveniently provided with a handle 6, as well as a detachable lid 7 adapted to tightly seal the top opening or mouth of the body 5.

As one can see from FIGS. 2 and 3, in the bottom portion of the container 3, on the bottom wall 5a, a stirrer, generally indicated with 8, is removably positioned.

In the embodiment shown by way of example, the stirrer 8 has an overall annular configuration, with outer transverse sizes preferably close to the inner transverse sizes of the bottom portion of the lateral wall 5b of the container 3 adjacent to the bottom wall 5a. Conveniently, the outer transverse sizes of the stirrer 8 are such that the stirrer is able to rotate with minimal friction with respect to the container 3 about an axis or rotation Z-Z coaxial with the body 5, so that when the container 3 is in the working position shown in FIG. 3 the axis of rotation Z-Z extends along a substantially vertical direction.

The stirrer 8 further comprises a radially outer, annular member 9, provided with permanent magnets 10. As it will be clearer from the following part of the present description, the annular member 9 is basically a permanent magnet rotor of an electric motor.

The stirrer 8 further comprises stirring means that, in the embodiment shown by way of example, comprise a coil 11 which is made from a plastic or metallic wire, is closed in a circular ring, and is positioned and fixed inside the annular member 9. The coil 11 is, for example, similar to the one shown and described in the prior document cited in the initial part of the present description.

Alternatively, the stirrer 8 may be provided with stirring means having other shapes or configurations, like flaps, vanes, filamentous appendixes, etc., that do not necessarily extend inside the annular member 9.

Conveniently, between the radially outermost surface of the annular member 9 and the internal surface of the adjacent portion of lateral wall 5b of the body 5 of the container 3 a minimal radial play is defined, which is adapted to allow the stirrer 8 to rotate about the axis of rotation Z-Z almost without friction and without significant oscillations in the horizontal plane.

The apparatus 1 further comprises electrically-operated driving means, adapted to cause in use a rotation of the stirrer 8 about the axis of rotation Z-Z, when the container 3 is positioned in the working position in the seat 4 of the support base 2.

In the illustrated embodiment, these driving means comprise a stator 12 included in the support base 2 structure. The stator 12, that is illustrated only schematically in FIGS. 2 and 3, is of one of the several known types suitable for use in an electric motor. It may comprise a coil connectable with a power supply through an electric cable 13 connected to the support base 2.

The arrangement is preferably such that when the container 3 is positioned in the working position on the support base 2 (FIG. 3), the stator 12 extends around the stirrer 8 and is thus separated from the annular member 9 carrying the permanent magnets 10 by a radial air gap having a very limited size, basically corresponding to the thickness of the lateral wall 5b of the body 5 of the container 3, or a little bit more.

In such a condition, when the stator 12 is coupled to the power supply, it generates a rotating magnetic field that interacts with the permanent magnets 10 of the stirrer 8, thereby causing the stirrer 8 to rotate about the axis of rotation Z-Z.

By virtue of the positive mechanical connection of the stirrer 8 with the bottom portion of the lateral wall 5b of the body 5 of the container 3, as well as with the bottom wall 5a of the same, the bottom wall 5a may be conveniently made as a flat wall, with no protrusions or recesses arranged to work as hub for supporting the stirrer 8 for rotation.

Cleaning and washing of the container 3 after use is thus extremely simple.

The structure of the apparatus according to the invention also is remarkably simple. Indeed, just arranging the stator 12, that, coupled with the annular member 9 of the stirrer 8, makes up a sort of electric motor, is sufficient to drive in rotation the stirrer 8.

According to the prior art, instead, a whole electric motor is provided in the support base, comprising a stator and a dedicated rotor, as well as a shaft having a magnetic structure suitable for magnetic coupling with the stirrer through the bottom wall of the container.

As an alternative to the arrangement illustrated in the drawings, the stator 12 may be integrated in the container 3 and, thus, be made separately from the support base 2. In this case, however, it would be necessary to provide electrical connection means for the coupling of the stator 12 with the support base 2 connectable with the power supply, or provide a detachable connector for direct coupling of a power supply cable to the stator.

With reference again to the attached drawings, a heating device 15 of a per-se-known type, for example of a resistive type, may be conveniently positioned in the support base 2, in order to allow to heat the liquid contained in the container 3 during the preparation of the foam. Such a heating device 15 may be connected to the power supply through the same cable 13 cited above.

Naturally, the principle of the invention remaining unchanged, the embodiments and constructional details may vary widely from those described and illustrated purely by way of non-limiting example, without thereby departing from the scope of the invention as defined in the enclosed claims.

The invention claimed is:

1. An apparatus for preparing a foam from milk-based liquid, comprising
    a support base,
    a container for containing an amount of said liquid, the container being arrangeable in a working position on the support base,
    a stirrer adapted to be removably positioned in the container to rotate about an axis of rotation (Z-Z), and
    electrically-operated driving means, positioned outside the container and arranged to be magnetically coupled with the stirrer to drive the stirrer in rotation about said axis of rotation (Z-Z), so as to stir the liquid in the container and form said foam, wherein the stirrer comprises a member provided with permanent magnets and stirring means connected to said member, wherein said driving means comprises a stator which is disposed around said member of the stirrer at least when the container is placed in the working position on the support base and is arranged, when coupled with a power supply, to generate a rotating magnetic field about said axis of rotation (Z-Z) to cause rotation of said member, whereby said member operates as a rotor to drive in rotation said stirring means, wherein said container has a flat bottom wall from which an annular lateral wall extends upward and wherein said stirrer is operatively positioned on said flat bottom wall and has outer transverse sizes which are close to the inner transverse sizes of a portion of the lateral wall of the container adjacent to the flat bottom wall, so as said stirrer is coupled with said flat bottom wall and said portion of the lateral wall adjacent to the flat bottom wall acting as positioning means with respect to the stator that generates the rotating magnetic field, wherein said stirrer has an overall annular configuration, wherein said flat bottom wall has no protrusions or recesses arranged to work as hub for supporting the stirrer for rotation, and wherein said axis of rotation of said stirrer is coaxial with a body of the container.

2. The apparatus according to claim 1, wherein said member of the stirrer has an annular shape and said stirring means extend at least in part inside the member of the stirrer.

* * * * *